Patented Nov. 27, 1934

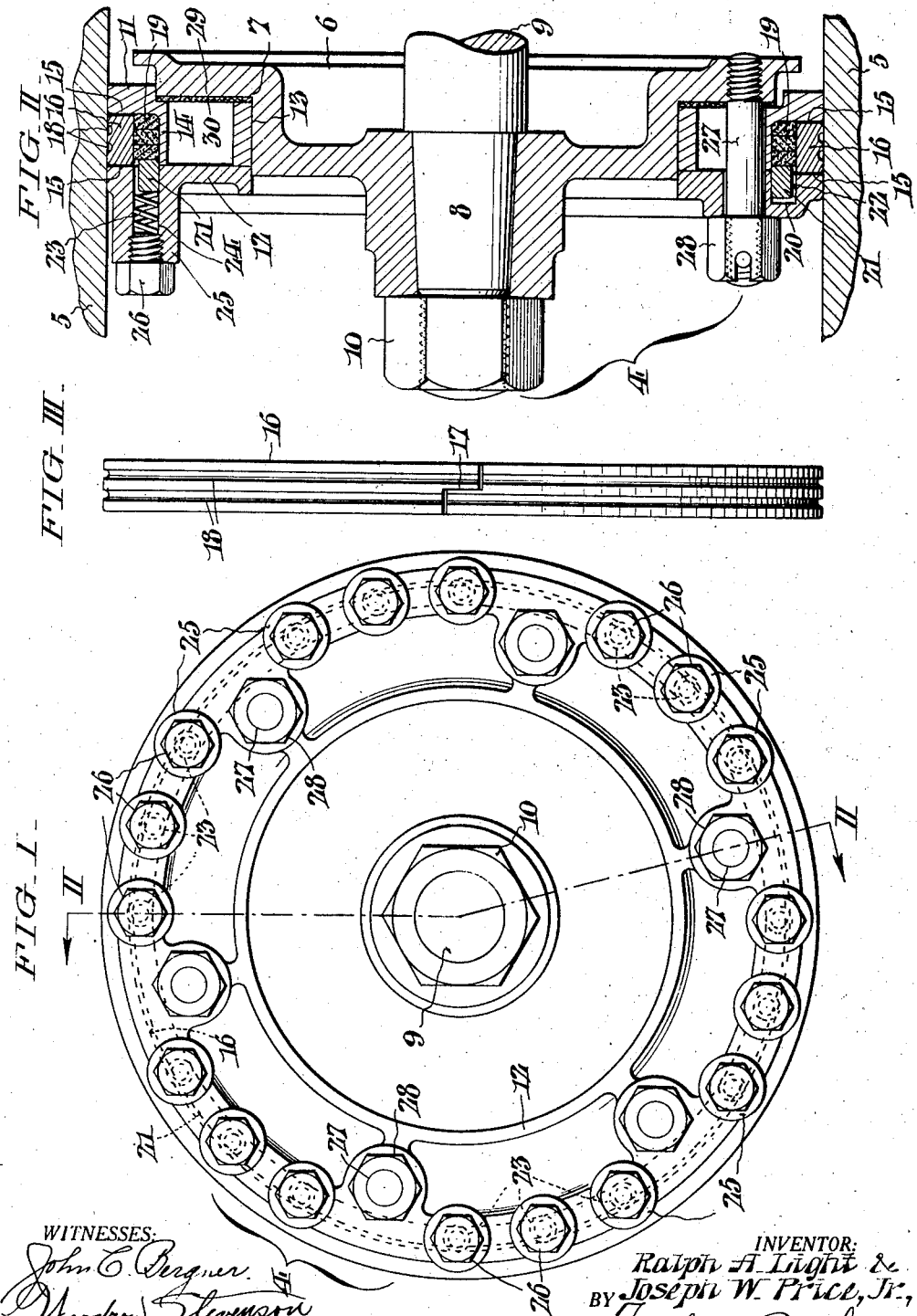

1,982,614

UNITED STATES PATENT OFFICE

1,982,614

PISTON PACKING

Ralph A. Light, Cynwyd, and Joseph W. Price, Jr., Philadelphia, Pa., assignors to The United States Metallic Packing Company, Philadelphia, Pa., a corporation of Pennsylvania Application July 24, 1933, Serial No. 681,917

6 Claims. (Cl. 309—39)

This invention relates to piston packings; and it has reference more particularly to piston packings for power reverse gears used on steam locomotives.

A recent ruling of the Interstate Commerce Commission requires that all steam locomotives over a certain weight be equipped with power reverse gears, and further that, in addition to the connections for compressed air by which such reverse gears are usually operated, the installation of steam connections to the locomotive boilers so that, in the event of breaks in the air lines, it is possible to operate the gears with steam and thus enable control of the locomotives through reversal in the operation of their valve motions, with the main cylinders acting after the manner of air compressors, to gradually reduce the speed of the locomotives and thereby finally bring the trains to a stop. The composite asbestos and rubber piston packings heretofore generally employed in reverse gears, while satisfactory for compressed air operation, are entirely unsuited for steam operation by virtue of the fact that they disintegrate under the heat of the steam with resultant leakage of the steam past the pistons, thereby allowing the latter to creep with attendant mal-operation of the reverse gear as a whole.

In the main, our invention is directed toward overcoming the above mentioned drawbacks, that is to say, we aim to provide a simple, inexpensive and easily replaceable packing which is especially suited for pistons of locomotive reverse gears, which will effectively resist the action of heat when steam is employed as the motivating pressure medium, and which moreover can be relied upon for maintenance of a substantially perfect fluid-tight seal between the pistons and the surrounding walls of the actuating cylinders of such gears.

A further aim of our invention is to secure the foregoing advantages in a packing which can be used in connection with the standardized pistons of power reverse gears for locomotives without requiring any structural changes whatever either in the pistons or the cylinders of said gears.

Still other objects and attendant advantages of this invention will be manifest from the following detailed description of the accompanying drawing, wherein Figure I is a face view of a locomotive valve gear piston embodying our improved packing.

Fig. II is an axial section of the piston taken as indicated by the arrows II—II in Fig. I; and, Fig. III shows the edge view of a sealing ring which constitutes a part of the packing.

In Figs. I and II of these illustrations, the piston is comprehensively designated by the numeral 4; while the reverse gear actuating cylinder in which the piston reciprocates, is indicated in part at 5 in Fig. II only. The body member 6 of the piston 4 is of a standardized type designed for attachment of reversely positioned cup packings which have been generally employed in this art heretofore, said body member being formed with the characterizing annular peripheral shoulder 7 and being secured to the tapered end 8 of the axially-connected piston rod 9 by means of a jamb nut 10.

The packing with which the present invention is more especially concerned comprises a bull ring 11, and a follower ring 12 both of which are accurately machined to closely fit the bore of the cylinder 5 as well as to fit over the horizontal face 13 of the angular circumferential shoulder 7 of the body member 6. As shown in Fig. II, the bull and follower rings 11 and 12 jointly afford a circumferential groove 14 to receive, with a certain amount of side clearance at 15, 15, a sealing ring 16 which has a stepped split at 17 in Fig. III. Also, as shown, the sealing ring 16 is peripherally grooved at 18 to reduce its bearing area in contact with the cylinder wall, and to provide channels for lubrication. The depth of the groove 14, it will be noted from Fig. II, is such as to provide internally of the sealing ring 16, an annular interval into which we place soft resilient fibrous packing material such as conventionally shown at 19. On its inner face, the follower ring 12 has a circular recess 20 to accommodate an expander ring 21 which is so proportioned as to determine a circumferential clearance 22 between it and the inner periphery of the sealing ring 16 for a purpose later on explained. A number of helical springs 23 concealed within axial cavities 24 of bosses 25 at intervals around the follower ring 12 and held in compression by headed keeper screws 26, serve to yieldingly urge the expander ring 21 laterally against the soft resilient packing material 19. The packing material 19 is thereby caused to completely fill the annular space immediately within the ring 16, and at the same time to press outwardly and expand said sealing ring yieldingly into fluid-tight contact with the wall of the cylinder 5. As illustrated, the bull and follower rings 11 and 12 are suitably apertured for the purposes of lightness and for the passage of the usual stud bolts 27 on the body member 6 of the piston 4, and secured to said body member by nuts 28 engaging the threaded outer ends of said stud bolts. Interposed between the bull ring 11 and the vertical surface 29 of the shoulder 7 of the body member 6 of the piston 4 is a suitable gasket 30 of compressible packing material which prevents leakage of motivating fluid past the mutually contacting surfaces of said ring and the piston body member 6 as well as through the stud holes of said rings.

The sealing ring 16 we preferably fabricate from an alloy consisting of from 35 to 50 percent copper, approximately 3½ percent nickel and the remainder of lead. A sealing ring 16 of this composition operates smoothly with the cast steel or iron of the cylinder 5 with minimum wear of the contacting surfaces.

Due to their accurate machining and fitment into the cylinder 5 as aforesaid, the bull and follower rings 11 and 12 effectively support the weight of the piston assemblage, while the clearances at 15 permit flexibility in the piston head to compensate for wear in the cross head and guides (not shown) for the piston rod 9. By virtue of its resiliency the soft packing material 19 under the constant and uniform pressure exerted thereon by the spring-urged expander ring 21 will permit lateral movement within the limits of the side clearances at 15 acting at the same time to prevent leakage through the intervals between said expander ring and the bull and follower rings 11 and 12. In addition, the soft packing material 19 operates as a cushion for floatingly supporting the sealing ring 16 so that the latter is free to expand and contract as conditions may require with maintenance at all times of a substantially perfect fluid tight seal between the piston 4 and the cylinder 5 notwithstanding any possible axial disalignment of the piston head, this action being made possible in view of the clearance at 22.

From the foregoing it will be apparent that we have provided a simple, inexpensive and reliable packing which is particularly advantageous in connection with the pistons of power reverse gears for steam locomotives in that it can be substituted in lieu of the usual cup packings on such pistons. It is to be understood however that our invention is not limited to such use alone, since with suitable modifications within the scope of the appended claims it may be adapted generally to other forms of pistons.

Having thus described our invention, we claim:

1. A packing for a piston comprising bull and follower rings; a split metallic sealing ring freely engaged in a circumferential groove formed jointly by the bull and follower rings; soft resilient cushioning and packing material filling a circumferential interval between the inner periphery of the sealing ring and the bottom of the groove aforesaid; and axially influenced means housed in the follower ring laterally compressing the cushioning and packing material so as to floatingly support and keep the sealing ring expanded in yielding fluid-tight contact with the wall of a cylinder.

2. A packing for a piston comprising bull and follower rings; a split metallic peripherally-grooved sealing ring engaged, with provision of side clearance, in a circumferential groove formed jointly by the bull and follower rings; soft resilient packing and cushioning material filling a circumferential interval between the inner periphery of the sealing ring and the bottom of the groove aforesaid; and axially-influenced annular means sustained by the follower ring effective to compress the packing and cushioning material so as to floatingly support and keep the sealing ring in yielding fluid-tight contact with the wall of a cylinder.

3. A packing for a piston comprising bull and follower rings; a split metallic peripherally-grooved sealing ring freely engaged in a circumferential groove formed jointly by the bull and follower rings; soft resilient cushioning and packing material filling a circumferential interval between the inner periphery of the sealing ring and the bottom of the groove aforesaid; and spring-influenced annular means housed in a recess in the follower ring and laterally-engaging the cushioning and packing material so as to floatingly support and keep the sealing ring expanded in yielding fluid-tight contact with the wall of a cylinder.

4. A packing for a piston comprising bull and follower rings; a split metallic sealing ring freely engaged in a circumferential groove formed jointly by an angular peripheral shoulder in the bull ring and the inner face of the follower ring; soft resilient cushioning and packing material filling a circumferential interval between the inner periphery of the sealing ring and the bottom of the groove aforesaid; an expander ring housed in a recess in the follower ring with surrounding clearance and laterally engaging the soft cushioning and packing material; and means urging the expander ring inwardly to compress the cushioning and packing material so that the sealing ring is maintained expanded in fluid-tight contact with the wall of a cylinder irrespective of any axial-disalignment of the piston relative to said wall.

5. In combination, a piston having a body with an angular peripheral shoulder; a bull ring and a follower ring fitting the bore of the cylinder and removably mounted over the peripheral shoulder of the piston body; a split sealing ring freely engaged in a circumferential groove formed jointly by the bull and follower rings; soft resilient cushioning and packing material filling a circumferential interval between the inner periphery of the sealing ring and the bottom of the groove aforesaid; and means compressing the packing and cushioning material to maintain the sealing ring expanded in yielding fluid-tight contact with the wall of a cylinder.

6. In combination, a piston having a body with an angular peripheral shoulder; a bull ring and a follower ring fitting the bore of the cylinder and removably mounted over the peripheral shoulder of the piston body; a split sealing ring freely engaged in a circumferential groove formed jointly by the bull and follower rings; compressible packing and cushioning material filling a circumferential interval between the inner periphery of the sealing ring and the bottom of the groove aforesaid; an expander ring disposed within a circular recess at the inner face of the follower ring and bearing laterally against the packing and cushioning material; and a number of circumferentially arranged springs operative upon the expander ring for effecting compression of the packing and cushioning material to maintain the sealing ring expanded in fluid-tight contact with the wall of a cylinder.

RALPH A. LIGHT.
JOSEPH W. PRICE, Jr.